United States Patent
Zuo et al.

(10) Patent No.: US 8,724,777 B2
(45) Date of Patent: May 13, 2014

(54) METHOD, DEVICE AND SYSTEM FOR IMPLEMENTING EMERGENCY CALL OVERRIDE SERVICE

(75) Inventors: Mei Zuo, Shenzhen (CN); Yongping Huang, Shenzhen (CN); Wenjie Ling, Shenzhen (CN); Jingzhu Tang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 197 days.

(21) Appl. No.: 13/258,382

(22) PCT Filed: Jul. 20, 2010

(86) PCT No.: PCT/CN2010/075333
§ 371 (c)(1),
(2), (4) Date: Mar. 12, 2012

(87) PCT Pub. No.: WO2011/032426
PCT Pub. Date: Mar. 24, 2011

(65) Prior Publication Data
US 2012/0163561 A1 Jun. 28, 2012

(30) Foreign Application Priority Data
Sep. 18, 2009 (CN) .......................... 2009 1 0176118

(51) Int. Cl.
*H04M 11/04* (2006.01)
(52) U.S. Cl.
USPC .......................................................... 379/46
(58) Field of Classification Search
USPC .......................................................... 379/46
See application file for complete search history.

(56) References Cited

U.S. PATENT DOCUMENTS

| 2002/0085698 A1 | 7/2002 | Liebenow |
| 2008/0261592 A1 | 10/2008 | Silva et al. |
| 2009/0203350 A1 | 8/2009 | Gottlieb |
| 2012/0221707 A1* | 8/2012 | Lindholm et al. ............ 709/223 |

FOREIGN PATENT DOCUMENTS

| CN | 101068279 A | 11/2007 |
| CN | 101132560 A | 2/2008 |
| CN | 101163135 A | 4/2008 |
| EP | 2056556 A1 | 5/2009 |
| RU | 2005134185 A | 5/2007 |
| RU | 2008107997 A | 9/2009 |
| WO | 9836584 A2 | 8/1998 |

OTHER PUBLICATIONS

International Search Report in international application No. PCT/CN2010/075333, mailed on Oct. 28, 2010.
English Translation of the Written Opinion of the International Search Authority in international application No. PCT/CN2010/075333, mailed on Oct. 28, 2010.

* cited by examiner

*Primary Examiner* — Alexander Jamal
(74) *Attorney, Agent, or Firm* — Oppedahl Patent Law Firm LLC

(57) ABSTRACT

The present disclosure provides a method, device and system for implementing emergency call override service; wherein the implementation method comprise: a first application server (AS) on a called side receives an initial request message, carrying a service identifier indicating an emergency call override service, from a second AS on a calling side; and the first AS implements the emergency call override service according to the service identifier. In the IMS network architecture, by adding a service identifier, indicating emergency call override service, in an initial request message based on SIP, an AS network element on a called side can implement emergency call override service according to the service identifier, thereby solving the problem that the emergency call override service cannot be implemented in the current IMS network architecture.

10 Claims, 6 Drawing Sheets

(Prior Art)

(Prior Art)

METHOD, DEVICE AND SYSTEM FOR IMPLEMENTING EMERGENCY CALL OVERRIDE SERVICE

TECHNICAL FIELD

The present disclosure relates to the field of communications, and in particular to a method, device and system for implementing emergency call override service.

BACKGROUND

Firstly, the abbreviations mainly involved in this document are defined as follows.
  HSS: Home Subscriber Server;
  OSA: Open Service Architecture;
  IMS: IP Multimedia Subsystem;
  SIP: Session Initiation Protocol;
  AS: Application Server;
  UE: User Equipment;
  ISC: IP multimedia Service Control;
  SCS: Server Capability Server;
  SCIM: Service Capability Interaction Manager;
  CAMEL: Customized Applications for Mobile network Enhanced Logic;
  CAP: CAMEL Application Part;
  MAP: Mobile Application Part;
  IM-SSF: IP Multimedia Service Switching Function;
  P-CSCF: Proxy Call Session Control Function;
  S-CSCF: Serving Call Session Control Function;
  Sh: Communication Reference Point between HSS and AS;
  Si: Communication Reference Point between HSS and CAMEL AS (IM-SSF);
  Cx: Communication Reference Point between HSS and CSCF.

IP Multimedia Subsystem (IMS), as the core technology of the next generation network, provides a universal service enabling platform for future multimedia application with functions of service control, safety function such as authentication and authorization, charging, routing, registration, sip compression and Qos supporting etc. IMS is independent from access network, and IMS terminals support SIP protocol. IMS terminals are featured in high intelligence and easy implementation of service development. Furthermore, IMS, supported by packet-switched network, has one great advantage of supporting data service.

Based on the principle of separating service from control in next generation network, IMS provides, in its service layer, an open interface to access various service servers so that various service providers can provide their respective services to network through a standard interface. Correspondingly, service can be loosely coupled to lower layer of network; this brings a rapid and flexible service development environment. A service framework of IMS is shown in FIG. 1. The framework, as shown in FIG. 1, is composed of an S-CSCF and various application servers connected to the S-CSCF through various internal service control interfaces based on SIP. 3GPP criterion provides three kinds of service structures:
  1) SIP application server;
  2) OSA service capability server;
  3) Service application based on CAMEL (IM-SSF, IM service switching function).

Normally, when a calling party initiates a call to a called party, if the called party has stated his desire to avoid to be called by subscribing services such as call transfer, absent subscriber service, no disturbance, extension call limit, call forwarding etc., call application server and call control network element will not connect the call, initiated by the calling party, to the called party. Contrary to the above, emergency call override service is such that, if a calling terminal, with right of emergency call override, calls a called party by the approach of using emergency call override accessing code, the call application server and call control network element will execute emergency call override service and directly connect the call to the called party.

Traditionally, emergency call override service is implemented in Circuit Switch (CS) domain. In this meaning, emergency call override service is an IP Centrex service under soft switch network.

As shown in FIG. 2, the implementation process of emergency call override service in current soft switch architecture mainly comprises the following steps:

S201, a calling party terminal A calls a called party terminal B, by dialling in manner of emergency call override. Users A, B belong to a same soft switch, and the dialling manner is dialling service access code plus called number. The service code is a special identifier set by IP Centrex and configured on soft switch, and used for representing emergency call override service.

S202, the soft switch executes the following service processes after receiving an initial invite request: determining that the call is an inter-domain call and does not need cross-domain; analyzing the service access code; determining it as an emergency call override service; analyzing the service limitation of calling party; if the calling party terminal A has a call override right, then connecting the call to called party terminal B.

S203, the soft switch sends the initial invite request to user terminal B after executing service process.

But, a method for implementing emergency call override service is not disclosed currently in the IMS network architecture.

In the IMS network architecture, the call process is different from that under the soft switch architecture; and the process shown in FIG. 2 cannot implement the emergency call override in IMS network architecture.

Specifically, the S-CSCF executes a session control function in IMS network architecture; SIP AS, as an application server, is used for finishing service logic operation of multimedia voice and supplementary service of a user. As for a multimedia voice call, the S-CSCF triggers SIP AS through iFc triggering mechanism so as to implement specific service. As for a complete call, the S-CSCF needs to trigger the SIP AS for two times; wherein one is used for triggering an AS on the calling side; and the AS on the calling side finishes the calling side service logic; the other one is used for triggering an AS on the called side; and the AS on the called side finishes the called side service logic. As shown in Step 303 in FIG. 3, when the AS on the calling side finishes calling service logic, the AS on the calling side returns the initial INVITE request for establishing a call to S-CSCF. Then service access code information in called number is deleted, because that the AS on the calling side needs to convert the called number into global routable SIP URI or TEL URI, for the global routing of S-CSCF according to called number; thus, the AS on the calling side cannot transmit the service override right of the calling party to the AS on the called side. As shown in Step 305 in FIG. 3, when the AS on the called side receives the triggering of S-CSCF, it cannot determine whether the calling party has an emergency call override right and whether the call initiated by the calling party requires emergency call override; then the service logics of no disturbance or call forwarding services of called party are executed, thus the call override function is not implemented.

As shown in FIG. 3, the specific triggering process of basic call service in IMS network architecture is as follows:

S301, user UE sends a SIP initial INVITE request to its home S-CSCF and starts a SIP session.

S302, after receiving the request, the S-CSCF on the calling side deduces a service profile trigger (SPT) from the request and checks whether the SPT matches a filter criterion X; if matches, then the S-CSCF forwards the request to home AS1 of the calling party.

S303, the AS1 executes specific service logic according to ServiceKey subscribed by calling party, and sends the SIP request back to the S-CSCF on the calling side after the execution; and the service related information may be modified.

S304, the S-CSCF on the calling side searches for home S-CSCF of the called party after receiving the SIP request from AS1 and forwards the request to the S-CSCF on the called side.

S305, after receiving the request, the S-CSCF on the called side deduces SPT from the request and checks whether the SPT matches a filter criterion Y; if matches, the S-CSCF on the called side forwards the request to home AS2 of the called party.

S306, the AS2 executes specific service logic according to ServiceKey subscribed by called party, and sends the SIP request back to the S-CSCF on the called side after the execution; and the service related information may be modified.

S307, the S-CSCF on the called side checks the SIP request sent by AS2 and determines that the request does not match with any filter criterion; then the S-CSCF on the called side searches for a next hop according to normal SIP routing mechanism and forwards the request.

Based on above mentioned description, the emergency call override service in IMS network architecture cannot be implemented currently.

SUMMARY

In order to solve the problem in the prior art that the emergency call override service in IMS network architecture cannot be implemented currently, the present disclosure provides a method, device and system for implementing an emergency call override service, which can be applied in IMS network architecture.

To solve the problem above, according to an aspect, the present disclosure provides a method for implementing an emergency call override service, wherein the method comprises: a first Application Server (AS) on a called side receives an initial request message, carrying a service identifier indicating an emergency call override service, from a second AS on a calling side; and the first AS implements the emergency call override service according to the service identifier.

To solve the problem above, according to another aspect, the present disclosure provides an application server (AS), wherein the AS comprises a receiving module configured to receive an initial request message, carrying a service identifier indicating an emergency call override service, from an application server on a calling side; and an implementing module configured to implement the emergency call override service according to the service identifier.

To solve the problem above, according to still another aspect, the present disclosure provides another application server (AS), wherein the AS comprises a setting module configured to set a service identifier, indicating an emergency call override service, in an initial request message; and a sending module configured to send the initial request message to an AS on a called side.

To solve the problem above, according to still another aspect, the present disclosure provides a system for implementing emergency call override service, wherein the system comprises a first AS on a calling side and a second AS on called side.

The first AS comprises a setting module configured to set a service identifier, indicating an emergency call override service, in an initial request message; and a sending module configured to send the initial request message to the second AS.

The second AS comprises a receiving module configured to receiving the initial request message from the first AS; and an implementing module configured to implement the emergency call override service according to the service identifier.

In an IMS network architecture, by adding a service identifier, indicating emergency call override service, in an initial request message based on SIP, an AS network element on a called side can implement emergency call override service according to the service identifier. Furthermore, the method and device of the present disclosure are not limited to inter-domain users in traditional CS domain. Rather, the method and device of the present disclosure can be extended to users outside the domain.

BRIEF DESCRIPTION OF THE DRAWINGS

The accompanying drawings here are used for the further understanding of the present disclosure and forms a part of this application; the drawings and embodiments are used for explaining the present disclosure, not limiting the present disclosure.

DETAILED DESCRIPTION

The present disclosure is described below with reference to the accompanying drawings and embodiments in detail. It should be noted that the embodiments of the present disclosure and elements thereof can be combined with each other providing that there is no confliction between them.

The present disclosure provide a method, device and system for implementing an emergency call override service, which can address the problem of failing to achieve emergency call override service in a conventional IMS network architecture. According to the present disclosure, in an IMS network architecture, by adding a service identifier, indicating emergency call override service, in an initial request message based on SIP, an AS network element on a called side can implement emergency call override service according to the service identifier. Furthermore, the method and device of the present disclosure are not limited to inter-domain users in traditional CS domain. Rather, the method and device of the present disclosure can be extended to users outside the domain.

The present disclosure provides a method for implementing emergency call override service according to an embodiment.

Figure 1:
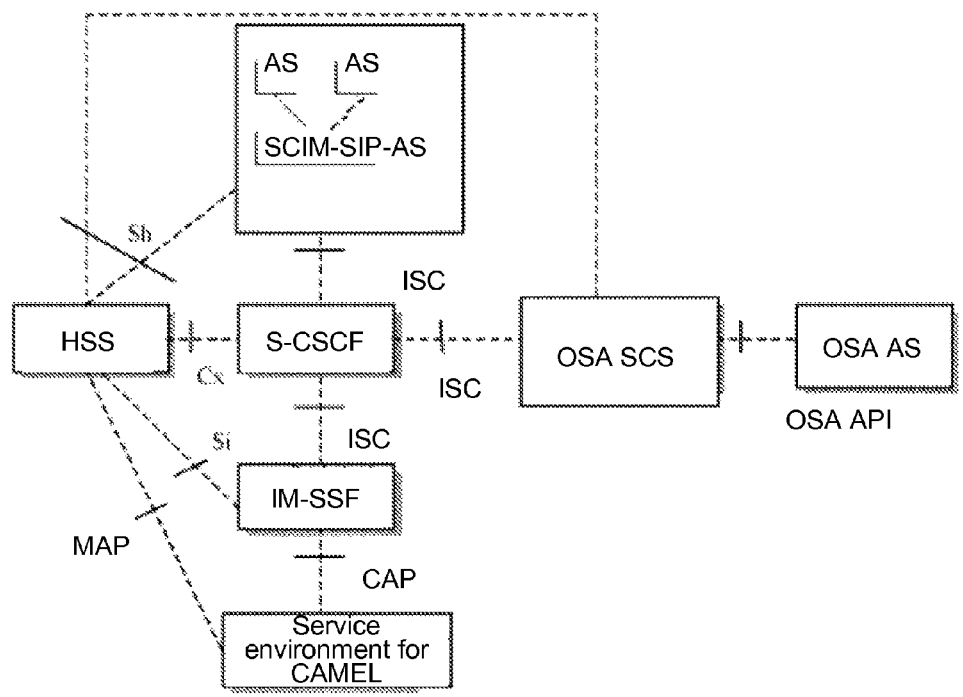
FIG. 1 shows a structural diagram of service network of IMS system based on related technology.
Figure 2:
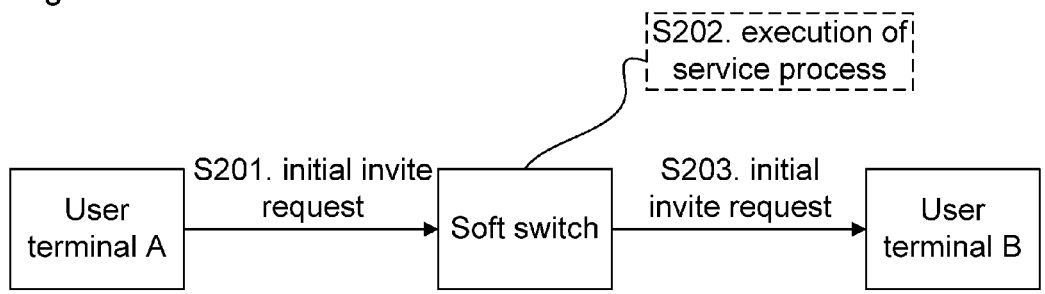
FIG. 2 shows a flowchart of an emergency call override service in soft switch system based on related technology.
Figure 3:
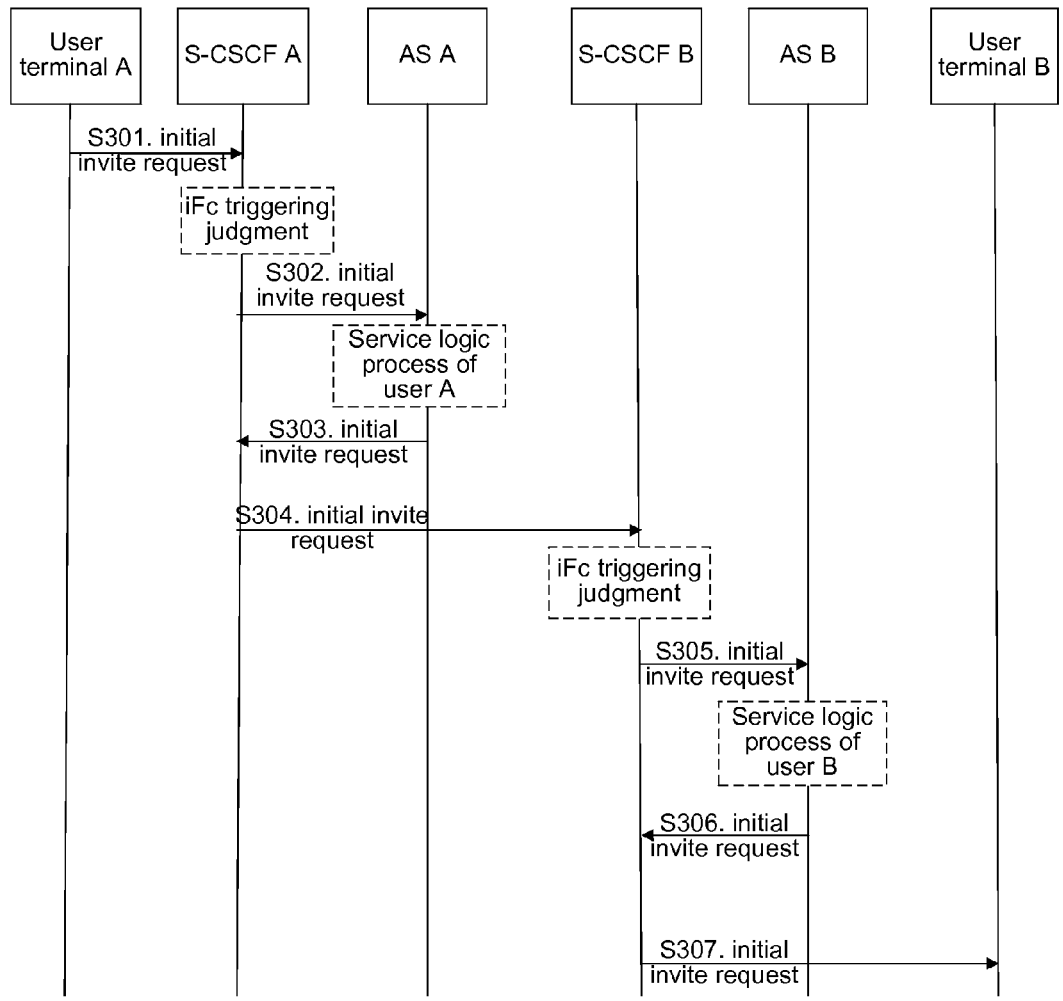
FIG. 3 shows a flowchart of basic call of IMS system based on related technology.
Figure 4:
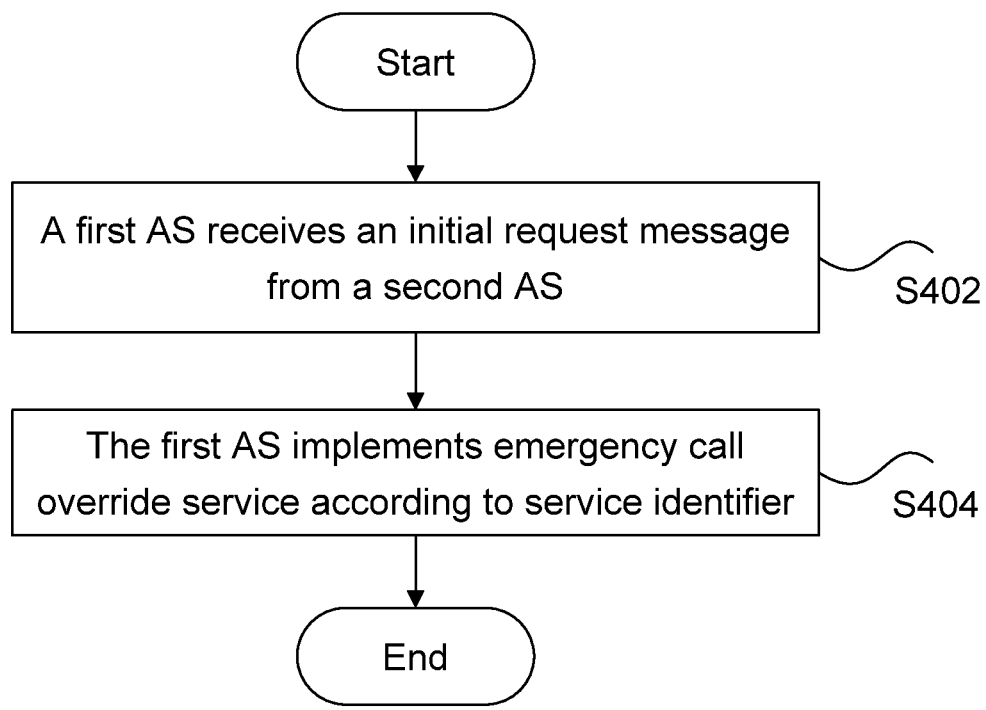
FIG. 4 shows a flowchart of a method for implementing emergency call override service according to an embodiment of the present disclosure.

FIG. 4 shows a flowchart of a method for implementing emergency call override service according to an embodiment of the present disclosure. As shown in FIG. 4, the method for implementing emergency call override service according to the embodiment of the present disclosure comprises the following steps:

S402, a first Application Server (AS) on a called side receives an initial request message from a second AS on a calling side, wherein the initial request message carries a service identifier indicating emergency call override service; and S404, the first AS implements emergency call override service according to the service identifier.

Preferably, the second AS may send the initial request message to the first AS through a Service Call Session Control Function (S-CSCF) entity.

Preferably, the service identifier may be carried in a message header of the initial request message. In this way, emergency call override service can be implemented in basic call process of the IMS network by adding a header parameter in an initial request message based on SIP, with no need of increasing the number of SIP messages. Accordingly, the implementation of emergency call override service will put no additional burden on network flow and system.

Before the first AS receives the initial request message from the second AS, the second AS receives a request message from the calling party, wherein the request message carries a service access code and information related to the called party. The second AS then, in case that the service code is determined to be an emergency call override access code, executes the operation of sending the initial request message to the first AS.

The operation of implementing emergency call override service by the first AS according to the service identifier may comprise: sending the initial request message from the first AS to the called party, to allow the called party to respond to the initial request message and to build a call connection with the calling party. Here, the first AS may send the initial request message to the called party through the S-CSCF entity.

Preferably, the first AS may delete the service identifier in the initial request message and then send the initial request message, with the service identifier deleted, to the called party.

Specifically, the method for implementing emergency call override service may comprise the following steps:

Step A: a home AS of the calling party, after receiving the initial request message, deletes the emergency call override service access code in "Requestline" of the message and returns the message, with the emergency call override service access code deleted, to the S-CSCF. The message returned to the S-CSCF carries a "P-Asserted-Service" header and the Service-ID of the message is set as "urn: 3gpp:mmtel.eco.version1", which means emergency call override service is needed. Then the initial request message is sent to a home AS of the called party.

Step B: the AS to which the called party attaches, receiving the initial request message with the "P-Asserted-Service" header and the Service-ID of "urn: 3gpp:mmtel.eco.version1", deletes the header and sends the call to the S-CSCF, without executing service logics of call transfer, call forwarding and no disturbance etc.

Furthermore, before Step A, the calling terminal user initiates an initial request message to build a call. The "Requestline" in SIP message carries an emergency call override service code and called party number information.

When receiving a call from the calling party, the S-CSCF on the calling side transparently transmits the service code and called party information carried in "Requestline" of message in process of triggering the AS on the calling side.

Furthermore, in Step A, the home AS of the calling party needs to determine whether the calling party has a right of emergency call override function.

Furthermore, in Step A, the home AS of the calling party needs to analyze the "Requestline" header in SIP signalling and determine whether the call initiated by current calling party is an emergency call override service.

Furthermore, before Step B, S-CSCF on the called side adds "P-Asserted-Service" header and information that the Service-ID is "urn: 3gpp:mmtel.eco.version1" into subscription rules of called party.

The present disclosure uses "P-Asserted-Service" header and sets Service-ID as "urn: 3gpp:mmtel.eco.version1", to indicate that user has the emergency call override function.

The process of the method of the present disclosure are simple and clear; and emergency call override service can be implemented in basic call process of the IMS network by adding a header parameter in an initial request message based on SIP, with no need of increasing the number of SIP messages. Accordingly, the implementation of emergency call override service will put no additional burden on network flow and system.

The process of the present disclosure is described below with reference to the examples in detail.

BNF normal form of P-Asserted-Service header is as follows:

PAssertedService="P-Asserted-Service" HCOLON PAssertedService-value
PAssertedService-value=Service–ID *(COMMA Service-ID)
Service-ID="urn:xxx:" urn-service-id
urn-service-id=top-level *("." sub-service-id)*("-" application-id)
top-level=let-dig [*26 let-dig]
sub-service-id=let-dig [*let-dig]
let-dig=ALPHA/DIGIT The Service-ID parameter in an embodiment of the present disclosure is expanded, wherein "xxx" is set as "3gpp"; "urn-service-id" is set as "mmtel.eco.version1", representing emergency call override service information.

For example, the header of P-Asserted-Service is set according to the following manner:

P-Asserted-Service: urn: 3gpp:mmtel.eco.version1

The method according to the following embodiments is applied in the following scene: user terminal A (calling party) subscribes an emergency call override service, and user terminal B (called party) subscribes services such as call transfer, no disturbance, or call forwarding etc.

Figure 5:
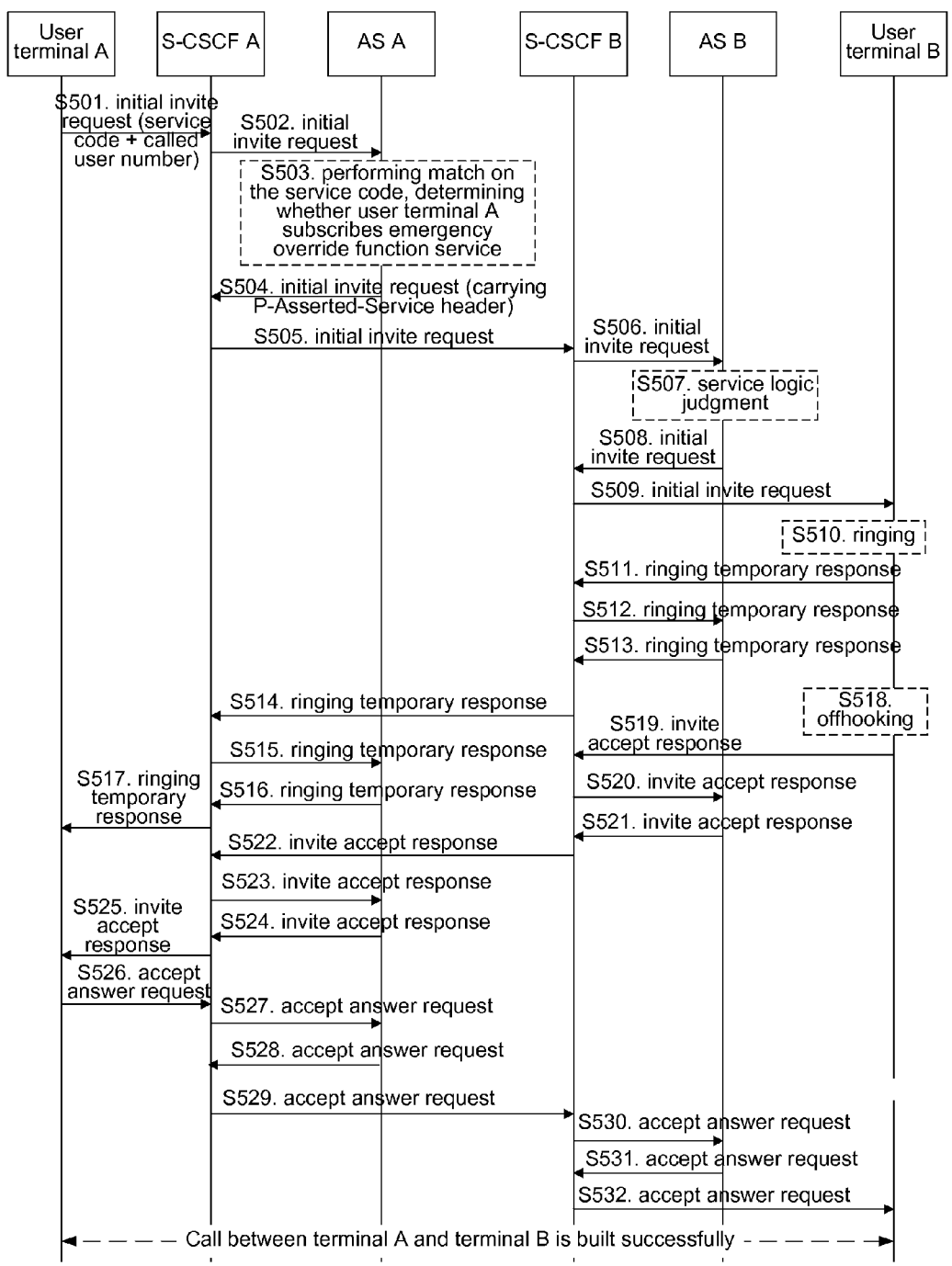
FIG. 5 shows a flowchart of a method for implementing emergency call override service according to a specific embodiment of the present disclosure.

FIG. 5 shows a flowchart of a method for implementing emergency call override service according to a specific embodiment of the present disclosure. As shown in FIG. 5, the method for implementing emergency call override service comprises the following steps:

S501, user terminal A calls a called party by dialling an emergency call override function service code first, then user number of the called party. In other words, emergency call override service code and called party number information are carried in "Requestline" of an initial invite request message.

S502, S-CSCF A receives the initial invite request message (which may be deemed as an initial request message), and triggers, based on iFc triggering rule, home application server of calling party A (AS A); this means that the initial invite request is sent to AS A.

S503, AS A receives the initial invite request, and if the service code in "Requestline" is determined to be matched with a pre-allocated emergency call override service access code (which is allocable and allocation of which should be informed to a user subscribing this function) and the user subscribes an emergency call override service, AS A deletes the emergency call override service access code in "Requestline" of the message and returns the message, with the emergency call override service access code deleted, to S-CSCF A. The returned request message carries a service identifier indicating emergency call override service, e.g. P-Asserted-Service: urn:3gpp:mmtel.eco.version1, which means that the calling party A requests to execute emergency call override function. Preferably, the service identifier is inserted into header of the request message.

S504, AS A returns the initial invite request message with the service identifier indicating emergency call override service to S-CSCF A after executing the service logic process.

S505, S-CSCF A receives the initial invite request, and sends the message to home service call session control function of calling party B (S-CSCF B) if S-CSCF A determines that, on calling party side, no other application servers need to be triggered.

S506, S-CSCF B receives the initial invite request that requires to execute emergency call override service logic process from S-CSCF A, and triggers, based on iFc triggering rule, home application server of called party terminal (AS B).

S507, after receiving the initial invite request, AS B checks whether the message carries a service identifier of emergency call override service, e.g. P-Asserted-Service: urn:3gpp:mmtel.eco.version1, thereby AS B can determine whether calling party terminal A initiates an emergency call override service. Here, if the service identifier is inserted into the header of the request message, then the header of request message is checked; if it is determined that the request is an emergency call override service, then AS B deletes the service identifier and does not execute the service logics of call transfer or no disturbance subscribed by the called party; then the initial invite request message, with the service identifier deleted, is sent to S-CSCF B so as to finish the override call function. Here, when it is determined that the request is an emergency call override service, the initial invite request message may also be sent to S-CSCF B directly, or sent to called party terminal B directly; if it is determined that the request is not an emergency call override service, then AS B executes service logics of call transfer or no disturbance subscribed by the called party according to original process and determines whether returning the initial invite request message back to S-CSCF B.

S508, AS B returns the initial invite request to S-CSCF B after executing the service logic process.

S509, S-CSCF B receives the initial invite request, and sends the message to called party terminal B (S-CSCF B) if S-CSCF B determines that, on called party side, no other application servers need to be triggered.

S510-S517, called party terminal B receives the initial invite request, reminds the called party that there is a call through ringing, and returns a ringing temporary response to the calling party A.

S518-S525, the called party picks up his/her phone to get through the call and the called terminal returns an invite accept response to the calling party.

S526-S532, after receiving the invite accept response, the calling party terminal sends an accept answer request to the called party terminal so as to finish handshaking negotiation for three times.

According to the present disclosure, in an IMS network architecture, by adding a service identifier, indicating emergency call override service, in an initial request message based on SIP, an AS network element on a called side can implement emergency call override service according to the service identifier. Furthermore, the method and device of the present disclosure are not limited to inter-domain users in traditional CS domain. Rather, the method and device of the present disclosure can be extended to users outside the domain.

The present disclosure provides an application server according to an embodiment.

Figure 6:
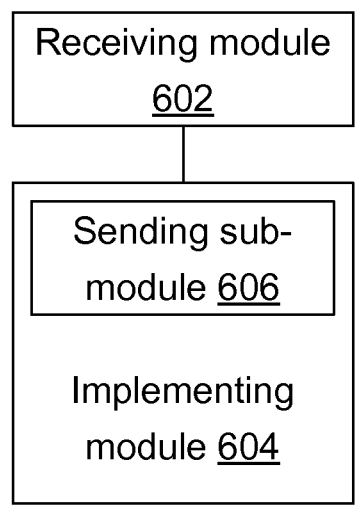
FIG. 6 shows a structural diagram of an application server according to an embodiment of the present disclosure.

FIG. 6 shows a structural diagram of an application server according to an embodiment of the present disclosure. As shown in FIG. 6, the Application Server (AS) is on a called side and comprises a receiving module 602, configured to receive an initial request message, carrying a service identifier indicating an emergency call override service, from an application server on a calling side; and an implementing module 604, configured to implement the emergency call override service according to the service identifier.

The implementing module 604 further comprises a sending sub-module 606, configured to send the initial request message to a called party, to allow the called party to respond to the initial request message and to build a call connection with a calling party.

The present disclosure discloses another kind of application server according to embodiments thereof.

Figure 7:
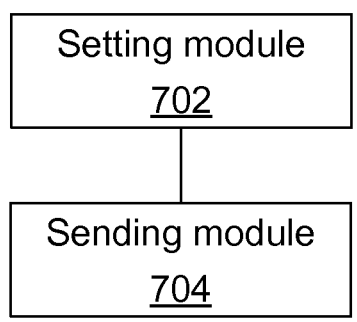
FIG. 7 shows a structural diagram of another application server according to an embodiment of the present disclosure.

FIG. 7 shows a structural diagram of another application server according to an embodiment of the present disclosure. As shown in FIG. 7, the application server comprises a setting module 702, configured to set a service identifier, indicating an emergency call override service, in an initial request message; and a sending module 704, configured to send the initial request message to an AS on a called side (e.g. application server shown in FIG. 6).

The application servers as shown in FIG. 6 and FIG. 7 can implement emergency call override service according to the above mentioned method, therefore no more details are given here.

The present disclosure further provides a system for implementing emergency call override service according to an embodiment.

Figure 8:
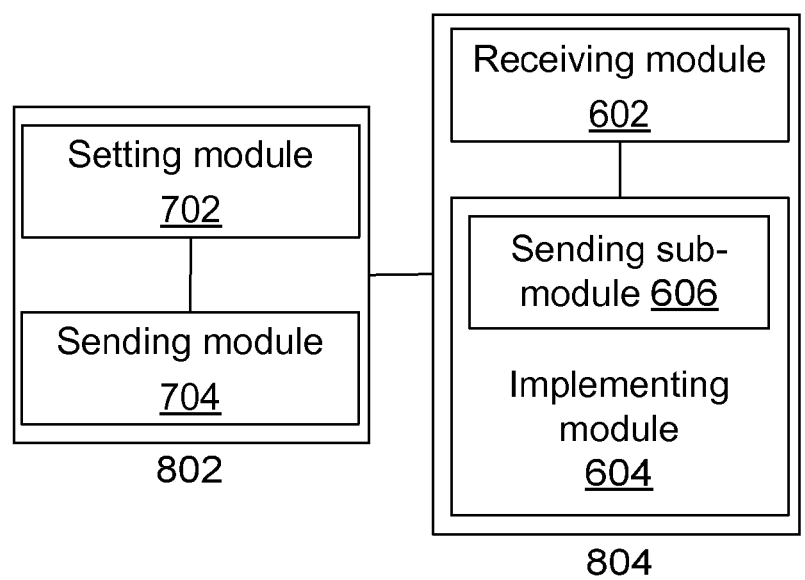
FIG. 8 shows a diagram of a system for implementing emergency call override service according to an embodiment of the present disclosure.

FIG. 8 shows a diagram of a system for implementing emergency call override service according to an embodiment of the present disclosure. As shown in FIG. 8, the system comprises a first AS 802 on a calling side and a second AS 804 on a called side.

The first AS 802 comprises a setting module 702, configured to set a service identifier, indicating an emergency call override service, in an initial request message; and a sending module 704, configured to send the initial request message to the second AS 804.

The second AS 804 comprises a receiving module 602, configured to receiving the initial request message from the first AS 802; and an implementing module 604, configured to implement the emergency call override service according to the service identifier.

The implementing module further comprises a sending sub-module 606, configured to send the initial request message to a called party, to allow the called party to respond to the initial request message and to build a call connection with a calling party.

The system for implementing emergency call override service can implement emergency call override service according to the above mentioned method, therefore no more details are given here.

According to the present disclosure, in an IMS network architecture, by adding a service identifier, indicating emergency call override service, in an initial request message based on SIP, an AS network element on a called side can implement emergency call override service according to the service identifier. Furthermore, the method and device of the present disclosure are not limited to inter-domain users in traditional CS domain. Rather, the method and device of the present disclosure can be extended to users outside the domain.

It should be noted that the steps shown in flowcharts in accompanying drawings are executed in a computer system which has a set of computer executable instructions; and the logic sequences shown in flowcharts can be different from the steps shown or described here in some conditions.

Obviously, those skilled in the art should understand that the modules or steps of the present disclosure can be implemented through a universal calculating device and concentred in a single calculating device or distributed in a network composed of several calculating devices; optionally, the modules or steps can be implemented through a program code executable by calculating device; thus, the modules or steps can be stored in a storage device and executed by a calculating device, or prepared into a single integrated circuit module, or several modules or steps are prepared into a single integrated circuit module. Therefore, the present disclosure is not limited to any specific hardware or software combination.

The above mentioned are only preferred embodiments of the present disclosure but not limitation to the present disclosure, various modification and variations can be devised by those skilled in the art, and any modifications, equivalent replacements, improvements and the like within the principle of the present disclosure shall fall within the scope of protection of the present disclosure.

The invention claimed is:

1. A method for implementing emergency call override service, comprising:
   receiving, by a second Service Call Session Control Function (S-CSCF) entity on a calling side, an initial request message including a service code from a calling party;
   passing-through, by the second S-CSCF entity, the initial request message including the service code to a second Application Server (AS) on the calling side;
   in the case that the service code is determined to be an emergency call override service access code, deleting, by the second AS, the service code from the initial request message, setting, by the second AS, a service identifier indicating the emergency call override service into the initial request message, and sending, by the second AS, the initial request message including the service identifier to the second S-CSCF entity;
   sending, by the second S-CSCF entity, the initial request message including the service identifier to a first S-CSCF entity on a called side;
   passing-through, by the first S-CSCF entity, the initial request message including the service identifier to a first AS on the called side; and
   implementing, by the first AS, the emergency call override service according to the service identifier.

2. The method according to claim 1, wherein the service identifier is carried in a message header of the initial request message.

3. The method according to claim 1, wherein the operation of implementing emergency call override service by the first AS according to the service identifier comprises: sending the initial request message from the first AS to a called party, to allow the called party to respond to the initial request message and to build a call connection with the calling party.

4. The method according to claim 3, wherein the operation of sending the initial request message from the first AS to the called party comprises:
   deleting, by the first AS, the service identifier in the initial request message and sending the initial request message, with the service identifier deleted, to the called party.

5. The method according to claim 3, wherein the operation of sending the initial request message from the first AS to the called party comprises:
   sending the initial request message from the first AS to the called party through the first S-CSCF entity.

6. An Application Server (AS) on a called side, comprising:
   a receiving module, configured to receive an initial request message, including a service identifier indicating an emergency call override service, from an application server on a calling side, before this, a service code in the initial request message determined to be an emergency call override service access code is deleted by the application server on the calling side and the service identifier is set in the initial request message by the application server on the calling side; and
   an implementing module, configured to implement the emergency call override service according to the service identifier.

7. The application server according to claim 6, wherein the implementing module comprises:
   a sending sub-module, configured to send the initial request message to a called party, to allow the called party to respond to the initial request message and to build a call connection with a calling party.

8. An Application Server (AS) on a calling side, comprising:
   a setting module, configured to set a service identifier, indicating an emergency call override service, in an initial request message, before this, a service code in the initial request message determined to be an emergency call override service access code is deleted; and
   a sending module, configured to send the initial request message to an AS on a called side.

9. A system for implementing emergency call override service, comprising a first Application Server (AS) on a calling side and a second AS on a called side, wherein the first AS comprises:
   a setting module, configured to set a service identifier, indicating an emergency call override service, in an initial request message, before this, a service code in the initial request message determined to be an emergency call override service access code is deleted; and
   a sending module, configured to send the initial request message to the second AS; and wherein the second AS comprises:
   a receiving module, configured to receiving the initial request message from the first AS; and an implementing module, configured to implement the emergency call override service according to the service identifier.

10. The system according to claim 9, wherein the implementing module comprises:
a sending sub-module, configured to send the initial request message to a called party, to allow the called party to respond to the initial request message and to build a call connection with a calling party.

* * * * *

UNITED STATES PATENT AND TRADEMARK OFFICE
CERTIFICATE OF CORRECTION

PATENT NO.        : 8,724,777 B2
APPLICATION NO. : 13/258382
DATED             : May 13, 2014
INVENTOR(S)       : Zuo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 189 days.

Signed and Sealed this

Twenty-ninth Day of September, 2015

Michelle K. Lee
*Director of the United States Patent and Trademark Office*